United States Patent
Daetz et al.

(10) Patent No.: US 7,746,792 B2
(45) Date of Patent: Jun. 29, 2010

(54) METHOD, DETECTION DEVICE AND SERVER DEVICE FOR EVALUATION OF AN INCOMING COMMUNICATION TO A COMMUNICATION DEVICE

(75) Inventors: Jorge Daetz, München (DE); Holger Lankes, Puchheim (DE); Stephan Schaade, Buchloe (DE)

(73) Assignee: Siemens Enterprise Communications GmbH & Co., Munich (DE)

( * ) Notice: Subject to any disclaimer, the term of this patent is extended or adjusted under 35 U.S.C. 154(b) by 285 days.

(21) Appl. No.: 12/085,097

(22) PCT Filed: Oct. 16, 2006

(86) PCT No.: PCT/EP2006/067427
§ 371 (c)(1),
(2), (4) Date: May 15, 2008

(87) PCT Pub. No.: WO2007/057267
PCT Pub. Date: May 24, 2007

(65) Prior Publication Data
US 2009/0252029 A1    Oct. 8, 2009

(30) Foreign Application Priority Data
Nov. 18, 2005    (DE) .................. 10 2005 055 148

(51) Int. Cl.
*H04J 3/14* (2006.01)
(52) U.S. Cl. ......................... 370/242; 726/11
(58) Field of Classification Search ............... 370/242, 370/243, 244, 245, 252, 352, 469, 471, 476; 726/11, 13, 14, 15
See application file for complete search history.

(56) References Cited

U.S. PATENT DOCUMENTS

| | | | |
|---|---|---|---|
| 6,499,107 B1 | 12/2002 | Gleichauf et al. | |
| 7,228,564 B2* | 6/2007 | Raikar et al. | 726/23 |
| 7,486,625 B2* | 2/2009 | Matityahu et al. | 370/242 |
| 7,623,465 B2* | 11/2009 | Yamamoto et al. | 370/242 |
| 2002/0097751 A1* | 7/2002 | Fukuoka et al. | 370/503 |
| 2004/0059942 A1 | 3/2004 | Xie | |
| 2004/0111632 A1 | 6/2004 | Halperin | |
| 2004/0257999 A1* | 12/2004 | MacIsaac | 370/252 |
| 2006/0182036 A1* | 8/2006 | Sasagawa et al. | 370/242 |

FOREIGN PATENT DOCUMENTS

| | | |
|---|---|---|
| DE | 10226744 A1 | 1/2004 |
| WO | WO 01/84285 A2 | 11/2001 |
| WO | WO 02/19644 A1 | 3/2002 |
| WO | WO 2005/055545 A1 | 6/2005 |

* cited by examiner

Primary Examiner—Brian D Nguyen

(57) ABSTRACT

A method, a detection device and a server device for evaluation of a communication arriving via a connecting line at the communication device are provided. Communication information which can be read or determined from the incoming communication is detected by the detection device which is coupled between the connecting line and the communication device, and is associated solely with the communication device. Furthermore, the detection device checks whether the detected communication information matches predeterminable data pattern information, and/or whether a response message to be initiated by the incoming communication from the communication device via the connecting line is absent. If the check result is positive, the detected communication information is stored, and is read out during the course of a central evaluation process carried out by the server device.

20 Claims, 3 Drawing Sheets

METHOD, DETECTION DEVICE AND SERVER DEVICE FOR EVALUATION OF AN INCOMING COMMUNICATION TO A COMMUNICATION DEVICE

CROSS REFERENCE TO RELATED APPLICATIONS

This application is the US National Stage of International Application No. PCT/EP2006/067427, filed Oct. 16, 2006 and claims the benefit thereof. The International Application claims the benefits of German application No. 10 2005 055 148.3 DE filed Nov. 18, 2005, both of the applications are incorporated by reference herein in their entirety.

FIELD OF INVENTION

The present invention relates to an evaluation of an incoming communication to a communication device.

BACKGROUND OF INVENTION

Voice communication systems within companies and organizations are increasingly using packet-oriented methods for voice communication. Frequently a reason for doing so is to allow shared use of the cabling of an IP-based data network (IP: Internet Protocol) for coupling of data computers, as well as for coupling IP-based communication devices of the voice communication system—for example IP telephones, gatekeepers, gateways.

The use of IP-based principles gives rise, in the voice communication system, to problems which were previously only known in computer networks. Thus for example an IP telephone can be attacked by a computer virus, a computer worm or a denial-of-service attack and thus caused to malfunction. A firewall in the data network which can block unwanted data traffic usually provides protection against these types of attack. A firewall is however frequently not optimized for protection against attacks on IP telephones. Furthermore a firewall may not be configured too restrictively since the desired communication exchange should not be impeded.

SUMMARY OF INVENTION

Whereas an attack on a workstation computer which is not blocked by a firewall can frequently be rapidly detected by a user of the computer because of the unusual behavior of programs running on said computer and immediately reported to a service engineer responsible for the computer network, a malfunction of an IP telephone is frequently not so evident to the user since for example an incorrectly rejected call does not make any impression on the user since the telephone merely remains in its idle state.

Furthermore the user frequently does not know that his telephone is using IP-based methods. He is thus totally unaware of attacks on the telephone since this is largely unknown with traditional telephones which are based on time slot oriented methods. The user would thus not relate a malfunction of the telephone back to an attack on the telephone.

It is also problematic that attacks on an IP telephone can remain undiscovered since they frequently only occur for a short time and a user with an IP telephone which is in the idle state within this period is not aware of them. These attacks thus remain a nebulous permanent danger which can prevent use of the IP telephone in the communication system at any time.

As well as such deliberately initiated malfunctions of IP telephones, there is the problem, especially with IP telephones which communicate in accordance with a communication standard subject to a dynamic expansion process—such as the SIP standard (SIP: Session Initiated Protocol) for example that the IP telephones as communication partners of a connection have frequently not implemented the same protocol scope. Thus protocol elements can be sent out by a sending IP telephone which are not expected by the receiving IP telephone and which the latter cannot deal with. Once again it is usually not obvious for a user in such a situation why a service feature or a function of his IP telephone is not being executed as required. This type of malfunction is based especially on the one hand on a lack of implementation of protocol elements of a communication standard in the IP telephone or on the other hand on an incorrect implementation of the protocol elements.

Even in cases in which it is known that a specific IP telephone is temporarily malfunctioning in the event of the problems outlined above it is frequently difficult to determine the cause of a malfunction which has occurred and to select measures through which the malfunction can be permanently rectified.

The underlying object of the present invention is thus, if a communication malfunction of a communication device occurs, to more easily recognize attacks on the communication device and/or a lack of implementation of protocol elements in the communication device and to evaluate said problems.

This object is achieved by a method, by a detection device, and also by a server device as claimed in the independent claims.

Advantageous embodiments and developments of the invention are specified in the dependent claims.

In the inventive method for evaluating an incoming communication, especially a packet-oriented communication via an access line to a communication device, communication information able to be read out from the incoming communication or able to be determined is recorded by a detection device uniquely assigned to the communication device connected between the access line and the communication device. "Uniquely" means in this case that each communication device is assigned precisely one detection device and that a respective detection device provides a service for precisely one communication device. A check is made by the detection device as to whether the recorded communication information matches predeterminable data pattern information and/or whether the response message to be triggered by the incoming communication from the communication device over the access line does not arrive. If the result of the test is positive the detected communication information is stored. This storage is preferably undertaken in the communication device or in a server device. The stored communication information is also read out within the context of a central evaluation undertaken by a server device which is preferably separate from the communication device and preferably central.

Within the context of the invention the access line is taken to be the linkage of the communication device to a communications system, a data network and/or a switching system, with each linkage being able to be made via cable or also wirelessly—for example with linkage via WLAN (Wireless Local Area Network)—as transfer medium. In particular that access of the communication device which is used for user data and/or signaling connections is to be understood as the access line.

The incoming communication especially involves a packet switched signaling connection or a packet switched user data connection, for example according to the SIP protocol (SIP: Session Initiation Protocol) or using a protocol in accordance with ITU-T Recommendation H.323 (ITU-T: International Telecommunication Union—Telecommunications Standardization Sector). Furthermore incoming communication can involve an undesired attack on the communication device, known as a computer virus, a computer worm, a denial of service attack or can involve an attack generating a buffer overflow in the communication device. The communication device is in particular a packet-oriented communication terminal, for example an IP telephone or a telephone application running on a workstation computer—known as a soft client—a gateway and/or a gatekeeper for packet-oriented voice, video and/or multimedia communication The communication information is read out from the incoming communication or determined from it and includes information about which type of data packet is involved in the incoming communication, about which sender the incoming communication was sent from, about the path over which the incoming communication arrived at the communication device, about the date or the time at which the incoming communication was transferred and/or about which protocol element of a connection is involved in the incoming communication. Furthermore the communication information can represent a sequence of binary data of the incoming communication. Rules for determining the communication information can be stored in an updatable form in the detection device in such cases.

The data pattern information can likewise be stored in an updatable form in the detection device and includes comparison values with which the detected communication information can be compared to see whether it matches. The data pattern information is in this case especially a pattern of a computer virus or a computer worm and/or the sender address of an incoming communication. Checking for a match or comparing the communication information with a data and information enables detection of whether the incoming communication involves a computer virus, a computer worm and undesired spam attack or any other attack. Thus an undesired incoming communication or a communication giving rise to a malfunction can preferably be detected in the detection device.

On detection the detected communication information is stored and provided to a server device for central evaluation. In these method steps it is especially advantageous for the incoming communication to be able to be analyzed and detected for a specific communication device. It is further advantageous for individual data pattern information and/or rules for detecting the communication information to be able to be provided to the communication devices in a communication system. Furthermore, on the basis of the central analysis in the server device, an analysis method for evaluation can be applied which is valid across the entire communication system.

As well as the detection of attacks on the communication device, the inventive method can also be used to detect incorrect or missing implementations of protocol elements of a transmission protocol. In such cases the returning of response messages from the communication device is also included in the analysis. An absence of a response message is an indication in these cases that the communication device is unable to react suitably or correctly to a protocol element of the sender, especially because the communication device does not support a service feature which is to be activated by the protocol element. For logging and for the analysis of incorrect protocol implementation based thereon, in the case of a missing response message the incoming communication is therefore locked such that the detected communication information is stored if the expected response message does not arrive. In this way it can be detected within the context of a central evaluation by a server device which communication devices in a communication system are not harmonizing with each other and which communication devices need a new software version. This is especially advantageous when using the SIP protocol, in which the usual reaction to an unrecognized service feature or protocol elements is the absence of an associated acknowledgement message.

The evaluation in a server device is especially advantageous as it enables communication system-wide evaluations, but also communication device-specific evaluations for a number of detection devices of a number of communication devices to be executed. To interrogate the detected communication information the server device can send a request message at regular or irregular intervals to the relevant communication device. In response the latter transfers the communication information accumulated and stored up to this point in time. Alternatively the communication devices involved can also transfer the stored communication information automatically to the server device—at intervals or after the storage of the respective communication information. Within the context of the central evaluation the server device can analyze malfunctions of communication devices or alternatively record usage statistics of the service features of the communication device.

The inventive method is especially advantageous in that only communication data traffic which has passed a firewall in the communication system can be analyzed and thus a multistage security concept can be implemented. It is further advantageous that rules for detecting the communication information and the data pattern information can be distributed and activated on a device-specific electronic basis. In addition it is advantageous that the detection device merely analyzes the incoming communication, but can forward it unchanged or largely unchanged, so that by contrast to a firewall, no change takes place in communication traffic.

Furthermore it proves advantageous for a central evaluation to be undertaken by the server device and thus a malfunction of a plurality of communication devices to be detected and possibly traced back to the same cause. Thus a service technician can easily detect by electronic interrogation of the server device whether a plurality of terminals need a new software version.

In an advantageous development of the inventive method the server device, on detecting a malfunction of a communication device, can automatically send a notification to a computer of a manufacturer of the communication device. In this way a manufacturer can react rapidly to attacks against the communication device or to an incorrect implementation of the communication device and then provide corrections. The server device in addition can especially be used for distribution of new software versions to the communication devices.

In a further advantageous development of the inventive method the server device can be connected to the communication device and further communication devices and, based on the evaluation, instruct one of the communication devices to block specific ports or to carry out communication via another port. This makes it possible to react to an attack on a port in a simple manner.

In an advantageous embodiment of the invention the server device can execute the request to the communication device—like the incoming communication—via the access line of the communication device. Preferably the request is based on IP-based principles. This advantageously allows the server device to be included with little outlay into an existing data network, for example a LAN (Local Area Network) of a company or an organization. This particularly allows the server device to be integrated into an existing network infrastructure, for example into a gatekeeper, into a registration unit for the communication devices and/or into a gateway.

An exemplary embodiment of the invention is explained in more detail below on the basis of a drawing.

BRIEF DESCRIPTION OF THE DRAWINGS

The figures are schematic diagrams which show

DETAILED DESCRIPTION OF INVENTION

Figure 1:
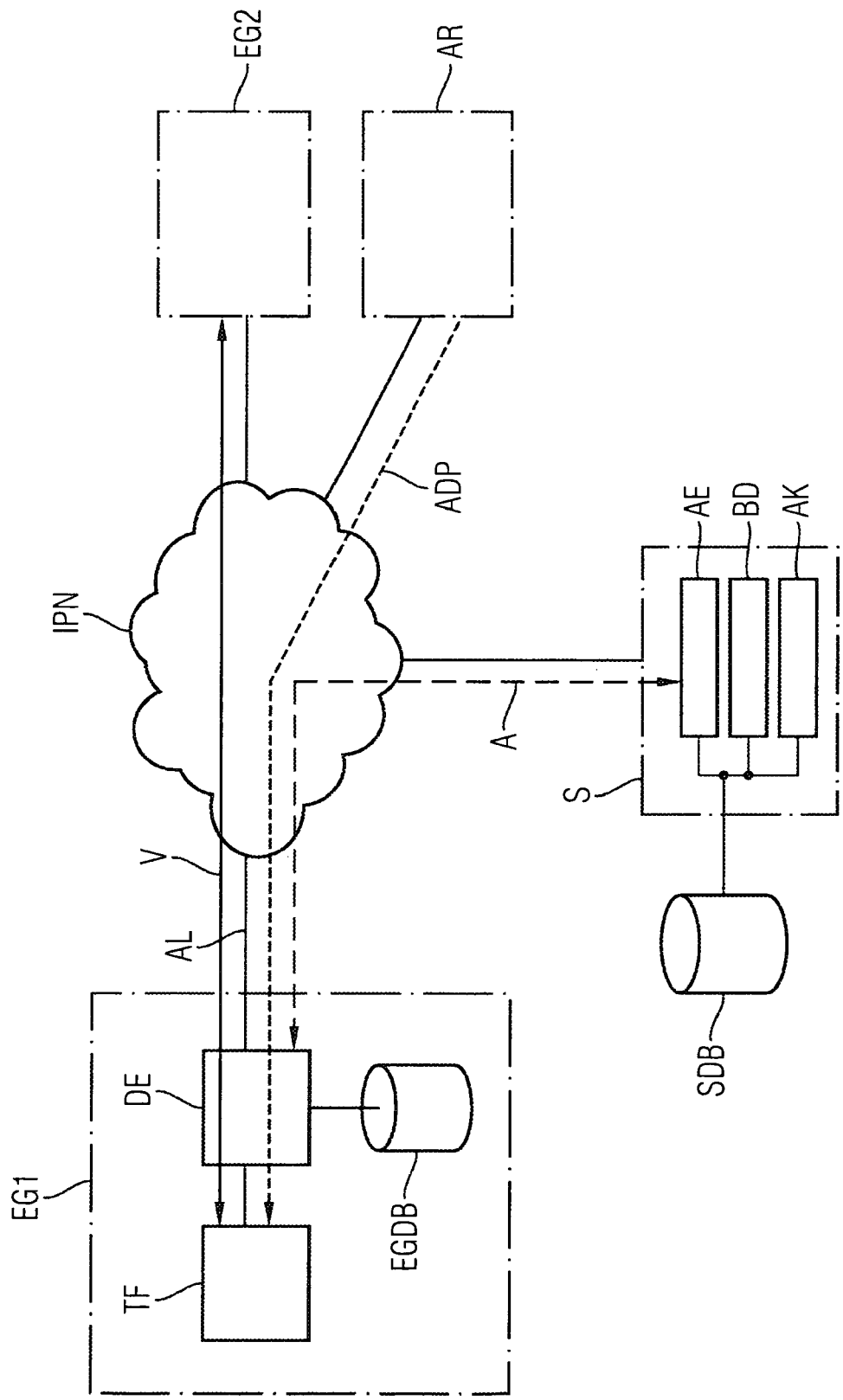
FIG. 1 the integration of an inventive server device and an inventive detection device of a communication device into a communication system, FIG. 2 a message flow diagram with the essential messages to and from the communication device, and FIG. 3 a flowchart with main steps executing in the detection device.

FIG. 1 shows a schematic diagram of a communication system for executing the inventive method. Located in this communication system are a first IP telephone EG1 as an inventive communication device, a second IP telephone EG2 and an attacking computer AR. Let the first IP telephone EG1 and the second IP telephone EG2 In the present exemplary embodiment be IP telephones based on the SIP protocol standard. These two IP telephones EG1, EG2 are connected via an IP network IPN. The first IP telephone EG1 is connected to the IP network IPN via the access line AL and can be designed for connection by wire or wirelessly, for example via a wireless LAN. A connection V between the first IP telephone EG1 and the second IP telephone EG2 is made via the access line AL and the IP network IPN and includes packet-oriented signaling and user data messages, especially for voice communication. The attacking computer AR is likewise coupled to the IP network IPN—possibly arranged outside a LAN and coupled to the LAN via an access computer not shown—and can transmit attack data packets ADP via this to the first IP telephone EG1, in order to influence the first IP telephone EG1 with said packets. The attack data packets ADP and the connection V can especially represent the inventive incoming communication.

Furthermore a server S is coupled as an inventive server device to the IP network IPN. Via this coupling the server S can request from the first IP telephone EG1, within the framework of a central evaluation, communication information stored in the first IP telephone EG1. These requests are executed by the readout unit AE of the server S. in addition the server S includes an evaluation console AK for actuating the central evaluation and a notification service BD to inform further data processing devices in the communication system not shown in the diagram about the central evaluation.

The first IP telephone EG1 includes a telephone function device TF for executing normal telephony functions such as setting up a call, accepting a call and executing telephone service features. Furthermore the first IP telephone EG1 includes a detection device DE coupled to the telephony function device TF in accordance with the invention. The detection device DE is also coupled directly to the access line AL and to a terminal database EGDB as well, which can store communication information, rules for the communication information, data pattern information and stored protocols created by the method in accordance with the invention. Also located in the communication system are further IP telephones not shown, which together with the first IP telephone EG1 are interrogated by the server S in respect of stored communication information. This interrogated data of different IP telephones is stored by the server S in the, server database SDB coupled to the server S for further evaluation.

In a first scenario a connection V is established between the first IP telephone EG1 and the second IP telephone EG2. The connection V shown as a double arrow runs in this case starting from the second IP telephone EG2, via the network IPN, via the access line AL, through the detection device DE of the first IP telephone EG1 to the telephone function device TF of the first IP telephone EG1. Routers or switches located in the connecting path are not shown here. The data packets coming in via access line AL within the framework of the connection V—as inventive incoming communication—are analyzed in the detection device DE in accordance with predetermined rules which are stored in the terminal database EGDB. For the first scenario it is assumed that a rule exists that, for all incoming SIP data packets, the respective protocol elements of the SIP standard are extracted and are stored as communication information in a local memory (not shown) or in the terminal database EGDB. The protocol elements especially represent service features such as call setup, a conference call or a call redirection. For each incoming protocol element it is expected, for fulfillment of the SIP standard, that the telephone function device TF sends a respective corresponding acknowledgement message back via the detection device DE to the second IP telephone EG2. If this does not occur and the telephone function device TF does not send back any response, this is an indicator of the fact that the corresponding service feature or protocol element is not implemented—or not correctly implemented—in the first IP telephone EG1 and has therefore been discarded. After receipt and storage of a protocol element of the second IP telephone EG2 any returning data traffic over a certain period after receipt of the incoming communication from the second IP telephone EG2 is analyzed and checked by the detection device DE as to whether a suitable response message is being transferred for the stored protocol element from the telephone function device TF to the second IP telephone EG2. If an associated response message has not been received after a predetermined period of time, the detection device DE stores the protocol element in the terminal database in a local log. This local log represents a list of all protocol elements that are not supported by a first IP telephone EG1.

Advantageously the detection device DE forwards the user data and signaling traffic in both directions of communication transparently or unchanged so that the data traffic between the telephone function device TF and the second IP telephone EG2 is transmitted without modifications.

In a similar manner further local logs are stored by further IP telephones in a communication system in the respective terminal databases, with the logs being determined by the respective detection devices uniquely assigned to the IP telephones. Thus each IP telephone stores locally the protocol elements that the respective IP telephone does not support.

An interrogation message A is sent cyclically and at regular intervals to the respective IP telephone by the readout unit AE of the server S—indicated in FIG. 1 by double arrows between readout unit AE and detection device DE. Subsequently the detection device DE receiving the interrogation message A transfers the respective stored local protocol to the readout unit AE. This stores the transferred, received, local logs and the communication information contained therein in a common log or a common database table in the server database SDB. The stored communication information is thus available for communication system-wide evaluation in a central server device—the server S.

A manual, central evaluation based on the stored data in the server database SDB can now be conducted via the evaluation console AK. Furthermore an automatic evaluation can be conducted in cycles by the notification service BD based on the collected data of the server database SDB. Within the framework of the evaluation those protocol elements that are not supported by a specific device type can be determined on a communication device type-specific basis for example.

This evaluated or filtered data can for example then be transferred by the notification service BD to a computer of a manufacturer of the relevant IP telephone. The manufacturer can then make a correction to the firmware or software for the respective telephone and can make the correction available to the server S for onward distribution. In this way it can be determined quickly and easily which protocol element is not supported by a respective IP telephone and a correction request can also be submitted quickly and easily to a manufacturer so that the latter can provide a software correction This significantly simplifies the administration of the software versions and equipment of the various IP telephones in the communication system, since the communication devices requiring a software or firmware update can be recognized on the basis of real communication operation.

The method is not restricted in such cases to use for IP terminals, but can also be expanded to server devices such as gatekeepers or gateways. Advantageously the server S possesses the option of requesting different information from the respective IP telephones, for example the current software version, the time at which a transmission arrived and the date of the last readout of the terminal database EGDB.

The integration of the detection device DE into the first IP telephone EG1 in accordance with FIG. 1 is advantageous in so far as a negative influence affecting the signaling or user data traffic can be avoided in this way. In particular a delay in establishing communication or in the transmission of user data can be avoided. The integration of the detection device DE into the first IP telephone EG1 is further especially advantageous in that the detection device DE can refer back to the hardware and software components of the first IP telephone EG1, such as for example a receiver unit. Thus for example a processor of the first IP telephone EG1 can also execute the functions of the detection device DE. Alternatively the detection device DE could also be coupled outside the first IP telephone EG1 to its communication input. The invention can thus also be applied to existing commercially-available telephones not adapted to the invention.

In a second scenario the detection device DE is used to recognize attacks or obstructions from further computers and, within the framework of a central evaluation, to develop prevention strategies tailored to such situations. For detection of attacks patterns are stored as data pattern information in the terminal database EGDB, with which the incoming communication traffic is compared. A pattern is especially a byte sequence which for example represents the code of a computer virus. The initial situation in this scenario is that an attacking computer AR sends a computer virus packed into attack data packets ADP to an address and a port specified by an IP address—a so-called socket—of the first IP telephone EG1. The attack data packets ADP are shown in FIG. 1 as directed arrows from the attacking computer AR to the detection device DE.

The detection device DE of the first IP telephone EG1 receives the incoming attack data packets ADP and determines from said packets in accordance with a predetermined and/or predeterminable rule one or more items of communication information. This communication information is e.g. IP header content information of the attack data packets ADP or a data pattern within the user data area of the attack data packets ADP. In parallel to this or after readout and/or determination of the communication information the attack data packets ADP are largely transmitted onwards without delay to the telephone function device TF. This ensures that no data which might be of importance for the telephone function device TF gets lost.

The detection device DE now compares the communications information determined with the predetermined data pattern information and attempts in this way to recognize a computer virus, a computer worm, spam messages or other undesired incoming data packets. If there is no match the detection device DE discards the communication Information. If there is a match then the detection device DE creates a local log which includes information for this process. This is especially information about which data pattern has been recognized—for example a name of a computer virus—at what point in time of the data pattern was recognized and from which attacking computer the incoming attack data packets ADP were transferred. It can thus be determined on a communication device-specific basis which attacks were made on a respective IP telephone, how frequent these attacks were and from which sources these attacks came.

In a similar way to scenario 1 the server S can use the readout unit AE to request this stored communication information cyclically and periodically from the respective IP telephones, especially the first IP telephone EG1, and store it in the server database SDB. After storage in the server database SDB the communication information of all IP telephones requested in this way in the communication system is available for an analysis by the evaluation console AK or by the notification service BD. The evaluation console AK especially enables it to be determined statistically for all IP telephones in the communication system which type of attacks on the communication system were conducted, on which terminals attacks were conducted and via which communication paths these attacks were routed. In such cases it is especially relevant via which firewall an attack has been admitted.

The evaluation can be undertaken to take into account predetermined frequency threshold values. If an increase in the number of attacks is detected an alarm can be initiated for example by the notification service BD to an operator of the communication system. In this way for example a denial-of-service attack can be recognized in which usually a large number of incoming data packets are received at short intervals. Furthermore the notification service BD can create a security report and/or initiate a software update at the manufacturer of the IP telephone or of the firewall in the communication system. Furthermore if there are repeated attacks on a specific IP telephone, a new registration of this IP telephone can be conducted by the server S so that this is allocated a new communication address, especially IP address and/or port number. Furthermore, as a measure against attacks, the IP telephone can be notified by the server by means of a configuration message to undertake communication on a further port and to deactivate the existing port.

In an expansion of the thinking behind the second scenario, by contrast with analysis of attacks, statistical information about the supported protocols in the respective IP telephone can merely be determined by the respective detection devices. In this case all allowed protocol elements of a protocol standard are typically considered as data pattern information. As well as a purely statistical evaluation of this information—for example for determining of the frequency of use of service features—error analysis in respect of malfunctions of the relevant IP telephones can be facilitated by this method.

In the two scenarios it is especially advantageous that a comprehensive communication system-wide analysis of incoming communication in the communication system to IP telephones can be conducted. In such cases it is especially advantageous that specifically for a respective IP telephone different roles for detecting the communication information can be applied by the detection device. It is thus possible to make possible a different granularity of analysis of the incoming communication for each communication device.

Advantageously the server S will be integrated into an existing infrastructure. This is for example a license server for the IP telephones or a gatekeeper for executing service features of the IP telephones. By integrating the inventive server device into an existing server computer a modification of the network infrastructure can advantageously be avoided.

In a development the determination, recording, test and storage steps in the detection device can be executed by an independent process or by a self-contained processor independently of the processing of the incoming communication in the communication device. This is advantageous to the extent that it enables it be guaranteed that the analysis of the incoming data stream does not have any effect on the functionality of the communication device. A blocking of the communication device by the integration of a detection device can thus be prevented.

Advantageously the detection device DE can access a number or all of the protocol layers of an incoming communication within the framework of determining the communication information and can determine the communication information from one or more of these protocol layers. This makes it possible for data patterns to be defined for example on the transport layer and/or the application layer and enables them to be checked for matches. Furthermore data patterns which encompass all data packets can also be defined and checked, with the detection device DE able to store incoming data packets temporarily for this purpose in order to be able to check a number of data packets together.

In conjunction with checking the functionality of an IP telephone in real use it is especially advantageous, in addition to communication information, also to store information of the telephone function device TF of the first IP telephone EG1. This is especially states and/or state transitions of the communication terminal. With this information it can be made much easier for this service personal to find and correct an error in an existing IP telephone.

To notify the IP telephones to the server S in order to use a request message A to request the communication information from the IP telephones later, it can be necessary for the IP telephones to be registered in the communication system with the server S or with a further server, for these to be configured with the server S or for the server S to determine for itself the IP telephones to be monitored by means of polling. As an alternative to this embodiment the server S can also remain passive and the respective IP telephones send communication information autonomously in accordance with a predetermined time or process pattern to the server S. In this case the address of the server S should be known to the respective IP telephones so that the latter can issue messages to the server S. The transmission of the communication information by the respective communication device is advantageous here to the extent that a there can be a faster reaction to critical actions in the communication system than with regular polling by the server S.

Figure 2:
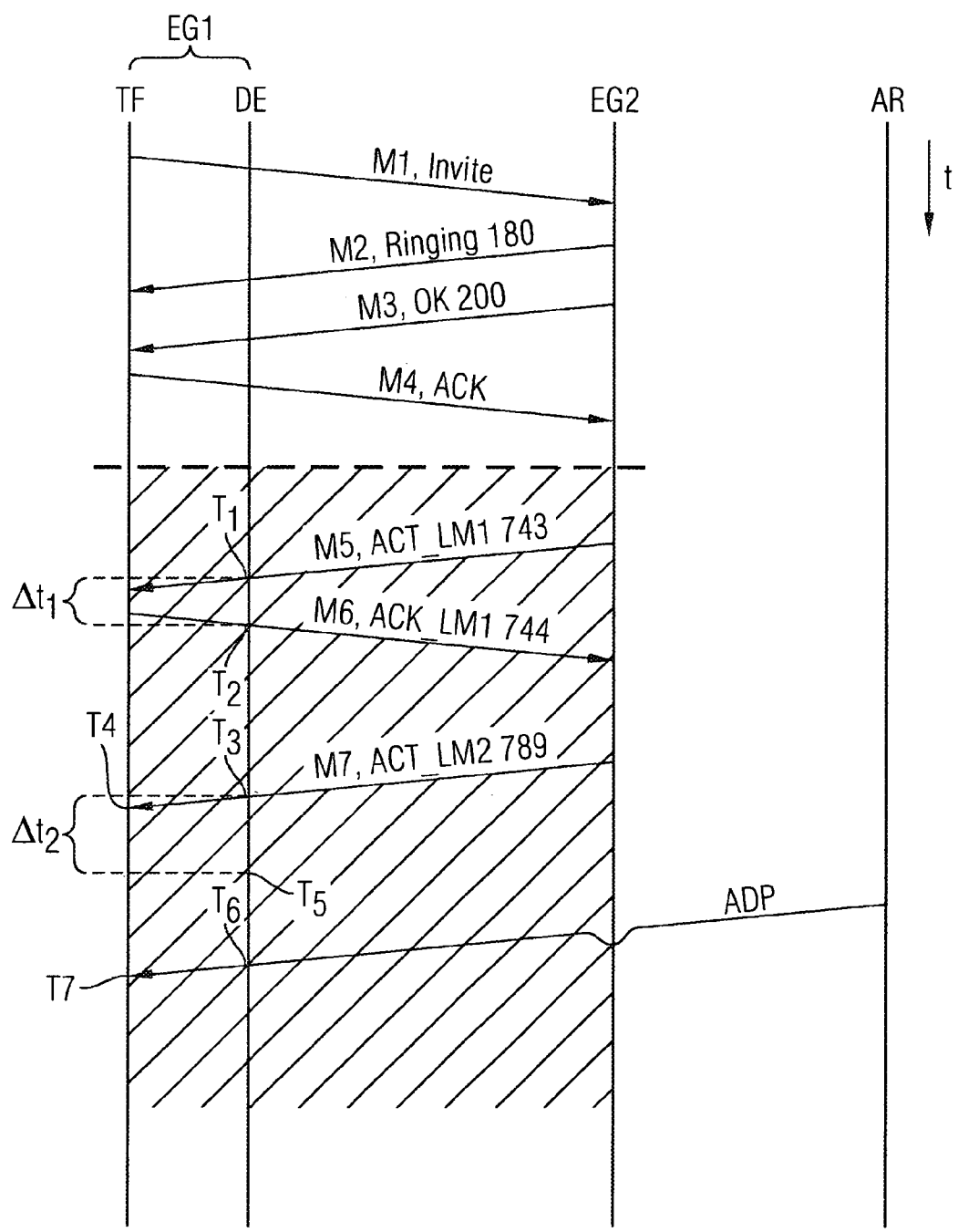

In FIG. 2 an exchange of messages and/or data to and from first IP telephone EG1 is illustrated in a message flow diagram. In the message flow diagram a time axis is plotted from top to bottom. Messages are represented as directed arrows with the arrowheads at a recipient of a respective message. The communication partners considered in FIG. 2 are the first IP telephone EG1 with its components telephone function device TF and detection device DE, the second IP telephone EG2 and the attacking computer AR, with these components being arranged horizontally next to each other and being shown within the framework of the message traffic as vertical lines.

Messages in accordance with the SIP protocol are labeled in FIG. 2 with the letter M and a sequence number. In some instances a possible message number similar to the SIP protocol is specified and a name of the message. Messages within the framework or the connection setup and messages during the established user data connection are separated from each other by a dashed line, with the period for an established user data connection having a cross-hatched diagonal background.

Message traffic is explained below with reference to FIG. 2, with the behavior of the detection device DE being illustrated on the basis of the message traffic with the aid of the flowchart shown in FIG. 3.

FIG. 2 illustrates a connection setup in accordance with the SIP protocol, initiated by the telephone function device TF of the first IP telephone EG1 by means a so-called invite message M1 to the second IP telephone EG2. The second IP telephone EG2 signals an incoming call to a user optically and/or acoustically and confirms this to the telephone function device TF by transmitting a so-called ringing message M2 with the SIP message number 180. In FIG. 2 it is assumed that the user of the second IP telephone EG2 accepts the connection, at which point a message M3 with the SIP message number 200 is transferred to telephone function device TF. The arrival of the OK message M3 is signaled by the telephone function device TF by means of a confirmation message M4, also called ACK, to the second IP telephone EG2. Subsequently the user data connection is set up between the telephone function device TF and the second IP telephone EG2.

All the said SIP message M1 to M4 pass through the detection device DE. This is illustrated in FIG. 2 by the messages crossing the line of the detection device DE. The detection device DE leaves its idle state when a message enters or passes through—state 1 in FIG. 3—and analyzes the type of data traffic involved—request 2 in FIG. 3. In this case SIP protocol elements are involved, with it being assumed in the present exemplary embodiment that the detection device DE has not defined any monitoring rules for the messages M1 to M4 and these messages are thus not considered any further. Therefore in FIG. 3, starting from the request 2, the path "incoming communication is other SIP data packet" is executed, which ends up in idle state 1.

The user connection between the first IP telephone EG1 and the second IP telephone EG2 is now set up, with two service features being initiated in turn by the user of the second IP telephone EG2. A service feature is for example the initiation of a conference connection between a number of communication terminals or a forwarding of the connection to a further communication terminal, with the service features being designated below as the first service feature LM1 and as the second service feature LM2.

An activation of the first service feature LM1 is initiated by the second IP telephone EG2 by means of a message M5 and transferred to the telephone function device TF. The message M5 is assigned the label ACT_LM1 in FIG. 2, as well as the SIP message number 743. When the message M5 passes through the detection device DE at point in time T1 this leaves its idle state 1, detects in the step 2, that the incoming communication involves an SIP data packet to be monitored and stores the SIP message number 743 in a temporary memory—action 3 in FIG. 3. A timer is started—action 4—and until the timer expires, the returning message traffic from the telephone function device TF to the second IP telephone EG2 is analyzed—request 5.

The first IP telephone EG1 supports the first service feature LM1 and replies to the message M5 with an acknowledgement message M6, ACK_LM1, with the SIP message number 744. When the acknowledgment message M6 passes through at point in time T2 the time difference ??t1 has elapsed, with this time difference ??t1 being shorter than the timer period. The detection device DE recognizes the received acknowledgment message M6 as acknowledgement for message M5 and further recognizes that the timer period has not yet elapsed—request 5. Then it clears the temporary memory—action 7—and returns to the idle state 1.

On activation of a further service feature, the second service feature LM2, it is assumed that the first IP telephone EG1 has a software version which does not recognize this second service feature LM2 and cannot implement it. Similarly to message M5, the second IP telephone EG2 now transmits a message M7 for an activation of the second service feature LM2 to telephone function device TF. Message M7 in FIG. 2 is designated ACT_LM2, as well as being assigned SIP message number 789. When the message M7 passes through the detection device DE at point in time T3 the latter leaves its idle state 1, detects in step 2 that the incoming communication involves an SIP data packet to be monitored and stores the SIP message number 789 in a temporary memory—action 3 in FIG. 3. A timer is started—action 4—and until the timer expires, the returning message traffic from the telephone function device TF to the second IP telephone EG2 is analyzed—request 5. The telephone function device TF receives the message M7 at point in time T4, but does not recognize this message M7 and cannot react to this message M7. No acknowledgement of any kind is transmitted—neither a positive nor a negative acknowledgement. When the timer times out after a time ??t2, at point in time T5 the detection device DE moves from the request state 5 to action 6, in which it permanently stores the unacknowledged temporarily stored protocol element in the terminal database EGDB and makes it available for an evaluation by the server S. Following action 6 the temporary memory can be erased by the detection device DE—action 7—and the idle state 1 can be assumed.

An explanation has been given above, with reference to message M1 to M7, as to how the detection device DE can analyze desired SIP data traffic. In addition the arrival of an undesired communication is illustrated below. In this case the attacking computer AR sends the attack data packet ADP to the first IP telephone EG1. The attack data packet ADP arrives at a time. T6 at the detection device DE and is forwarded to the telephone function device TF, where it arrives at a time T7. On receipt of the attack data packet ADP the detection device DE leaves its idle state 1, analyzes the attack data packet ADP—request 2—and categorizes this as a non-SIP data packet. This is followed by a switch to the request state 8, in which a check is performed as to whether the data packet involved is a usual data packet in the IP traffic to which no special attention has to be paid. This is for example a so-called ping request or a configuration message to the first IP telephone EG1. if this is the case, the detection device DE switches without further action back to its idle state 1.

If this is not the case, in the request 9 a pattern comparison is performed which compares the incoming data packet with known virus patterns and known further attack patterns from the terminal database EGDB. If no match is established the detection device DE returns to the idle state 1, since the incoming data packet either represents no attack on the first IP telephone EG1 or represents an attack for which no comparison pattern is predetermined as data pattern information. If on the other hand a match is established during pattern comparison, information about the incoming pattern or the pattern itself together with further information such as the current time of day and the current date are stored in a log file in the terminal database EGDB—action 10. Subsequently the detection device DE switches into the idle state 1.

Figure 3:
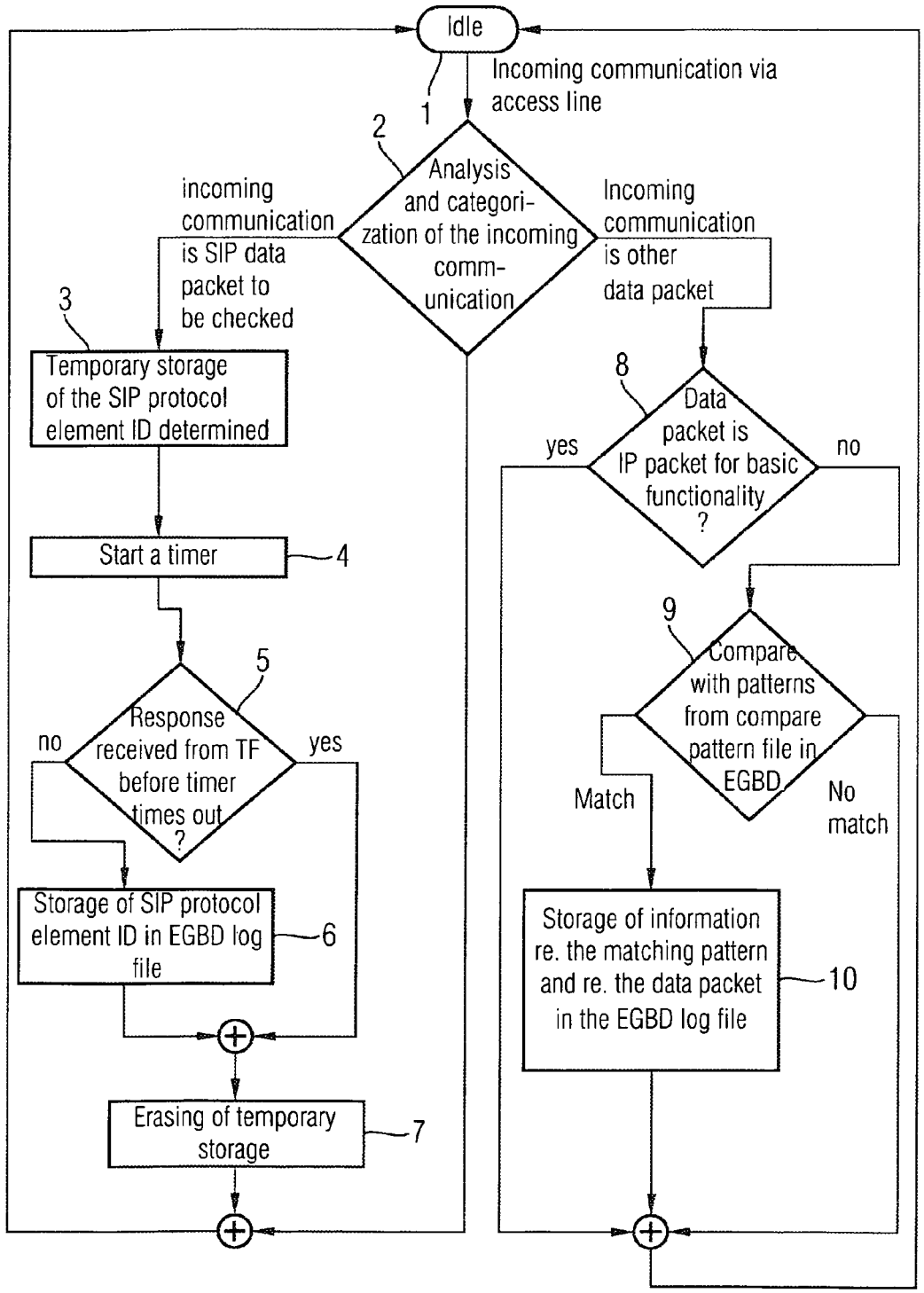

FIGS. 2 and 3 illustrate, by means of the said messages and state transitions, the way in which incoming data traffic at a communication terminal can be monitored and logged by the invention and a central server device can be made available for further evaluation. In this case the invention allows evaluation of whether traffic is specific data traffic, which type of data traffic it is and how frequently the data traffic has arrived at the communication terminal. Within the framework of the evaluation errors in the security rules of the communication network and/or of communication terminals can be detected without manual intervention by users of the communication terminals. Furthermore the absence of an implementation of service features or protocol elements in the communication terminal can be discovered and detected. Missing implementations or errors in the security rules can be evaluated such that, based on the evaluation, software corrections for the communication terminal or a firewall in the communication system can be initiated in an automated manner and may be able to be installed automatically.

In this way the invention especially allows an analysis of communication problems between communication devices in real operation. This is advantageous in that in normal communication systems a plurality of different communication devices or a plurality of the same communication devices but with different software versions and different protocol support can be present. Problems of communication devices in real installations can thus be located and corrected rapidly.

The evaluation of SIP service features is especially advantageous, as the SIP communication devices usually, if they do not recognize or do not support an incoming SIP protocol element, do not send any acknowledgement back to the communication partner and thus protocol elements and/or requirements remain unconfirmed. This can be detected using the invention within the framework of the evaluation.

Advantageously the data pattern information is copied in or updated at regular intervals, so that the detection device can refer back to a current status of comparison patterns. Advantageously, when data pattern information is copied in, on request and/or transmission of stored communication information secured protection mechanisms such as data encryption or security provided by electronic certificates are used, in order to prevent any illegal monitoring or interrogation of the communication device by unauthorized parties.

The data pattern information can preferably be defined in a markup language, such as XML (Extensible Markup Language) for example, advantageously use wildcards so that the data pattern information is restricted to just a few meaningful comparison patterns and a byte-by-byte comparison of long byte sequences can be avoided. Furthermore the data pattern information can also be used to define which is the set of allowed or known protocol elements and to assess a detection of an unknown protocol element as a positive test result in the sense of the invention.

In the definition of the data pattern information as an address range in the IP network the incoming communication can be evaluated separately starting from an address outside a predetermined address range. This is advantageous to the extent that the communication devices in a communication system are frequently allocated specific address ranges and thus an incoming communication from outside this address range can represent a potential attacker. The data pattern information can in this case for example be the so-called net mask of an IP address range.

The invention claimed is:

1. A method for evaluation of an incoming communication via an access line to a communication device, comprising:
   providing a detection device uniquely assigned to the communication device and coupled between the access line and the communication device;
   the detection device:
      detecting communication information able to be read out or determined from the incoming communication by the detection device;
      detecting a missing or incorrect implementation of a protocol element in the communication device, said detection device further comprising testing at least one action of:
         determining whether the detected communication information matches predeterminable data pattern information, and
         determining whether a response message from the communication device via the access line to be triggered by the incoming communication does not arrive,
      storing the detected communication information when the result of the test result is positive; and
      reading the stored communication information via a central evaluation undertaken by a server device,
   wherein the incoming communication involves a real time connection for voice communication.

2. The method as claimed in claim 1, wherein further communication information from at least one further detection device uniquely coupled to a further communication device is read out by the server device.

3. The method as claimed in claim 1, wherein the detection device is integrated into the communication device or is embodied as a self-contained device coupled to an access interface of the communication device.

4. The method as claimed in claim 1, wherein the detection device forwards the incoming communication unchanged from the access line to the communication device.

5. The method as claimed in claim 1, wherein in response to the receipt of the incoming communication the detection device determines at least one item of:
   a network protocol via which the incoming communication is being transported,
   a communication protocol which is used for the incoming communication for a media transmission,
   the destination address of the communication device to which the incoming communication is being sent,
   the destination port of the communication device to which the incoming communication is being sent,
   a sender address from which the incoming communication was transmitted,
   a communication partner via which the incoming communication is being routed to the communication device,
   a firewall device via which the incoming communication is being directed,
   the date and time of day at which the incoming communication arrives,
   a response message with which the communication device reacts to the incoming communication,
   the protocol element of a communication protocol which is transmitted via the incoming communication,
   a service feature which is to be activated via the incoming communication by the communication device, and
   wherein the determined item is stored and read out by the server device.

6. The method as claimed in claim 1, wherein the data pattern information represents an image or a pattern of a communication to be detected and a detection of a presence of the data pattern information in the detected communication information is assessed as a positive test result of the testing if there is a match between communication information and data pattern information.

7. The method as claimed in claim 1, further comprising transferring at least an item of:
   the data pattern information, and/or
   rules for determination of the communication information, and
   rules for checking that the communication information matches the data pattern information
   to the detection device prior to the detection of the communication information.

8. The method as claimed in claim 1, wherein the stored communication information is transmitted together at intervals to the server device or is requested by the server device.

9. The method as claimed in claim 1, wherein evaluations of the stored communication information are conducted by the server device repeatedly and automatically.

10. The method as claimed in claim 1, wherein statistical information about the stored communication information is determined by the server device.

11. The method as claimed in claim 1, wherein the data pattern information includes protocol elements of a communication protocol.

12. The method as claimed in claim 11, wherein the communication protocol is based on SIP or H.323.

13. The method as claimed in claim 1, wherein frequency statistics for the stored communication information matching the data pattern information are created for a period by the server device.

14. The method as claimed in claim 1, wherein defense information is transmitted by the server device to the detection device and subsequently a port specified in the defense information is blocked by the detection device and a communication block of the incoming communication specified by the defense information is filtered out.

15. The method as claimed in claim 1, wherein defense information is transmitted by the server device to the detection device and subsequently a port specified in the defense information is blocked by the detection device or a communication block of the incoming communication specified by the defense information is filtered out.

16. The method as claimed in claim 1, wherein at least one action of:
   alarm,
   creation of a security report,
   provision of analysis data for a further analysis
   initiation of a permissions update for a firewall,
   initiation of a firmware update for the communication device,
   initiation of a software update for the communication device,
   blockage of a function of the communication device,
   blockage of a service feature of the communication device,
   blockage of a port of the communication device,
   blocking, deactivating, shutting down, deregistering the communication device,
   issuing a new address of the communication device for further incoming communication, issuing a new port of the communication device for further incoming communication, and determination of a sending communication device sending the incoming communication, is initiated by the server device within the framework of the central evaluation.

17. The method as claimed in claim 1, wherein the communication device is configured by the server device.

18. The method as claimed in claim 1, wherein the communication device sends a registration message to the server device in order to register with the server device.

19. The method as claimed in claim 1, wherein the communication device sends a registration message to the server device in order to register with the server device.

20. The method as claimed in claim 1, wherein the communication device is detected and subsequently registered by the server device via a transmission of requests to devices within an address range and receipt of associated acknowledgements initiated thereby.

* * * * *